(12) United States Patent
Mori

(10) Patent No.: US 8,714,831 B2
(45) Date of Patent: May 6, 2014

(54) BEARING COMPONENT, ROLLING BEARING, AND METHOD FOR PRODUCING BEARING COMPONENT

(75) Inventor: Nobuyuki Mori, Kuwana (JP)

(73) Assignee: NTN Corporation, Osaka (JP)

( * ) Notice: Subject to any disclaimer, the term of this patent is extended or adjusted under 35 U.S.C. 154(b) by 165 days.

(21) Appl. No.: 13/259,680

(22) PCT Filed: Mar. 17, 2010

(86) PCT No.: PCT/JP2010/054545
§ 371 (c)(1),
(2), (4) Date: Sep. 23, 2011

(87) PCT Pub. No.: WO2010/110145
PCT Pub. Date: Sep. 30, 2010

(65) Prior Publication Data
US 2012/0020605 A1 Jan. 26, 2012

(30) Foreign Application Priority Data

Mar. 25, 2009 (JP) ................. 2009-073675

(51) Int. Cl.
*F16C 23/08* (2006.01)
*F16C 33/30* (2006.01)
*C22C 38/00* (2006.01)
*F16C 33/62* (2006.01)

(52) U.S. Cl.
USPC .......... 384/558; 384/492; 384/548; 384/625; 384/912; 148/218; 420/109; 420/128

(58) Field of Classification Search
USPC ........ 384/492, 558, 544, 548, 565, 625, 912; 148/218, 318, 328, 333; 420/109, 128; 156/333.3, 333.5, 310, 320; 526/204, 526/220; 525/518
See application file for complete search history.

(56) References Cited

U.S. PATENT DOCUMENTS 5,352,303 A * 10/1994 Murakami et al. ............ 384/625
5,672,014 A * 9/1997 Okita et al. .................... 384/492

(Continued)

FOREIGN PATENT DOCUMENTS

EP 2025765 A1 2/2009
JP 08-049057 2/1996

(Continued)

OTHER PUBLICATIONS

European Search Report issued in European Patent Application No. 10755943.7 dated Feb. 26, 2013.

*Primary Examiner* — Marcus Charles
(74) *Attorney, Agent, or Firm* — McDermott Will & Emery LLP

(57) ABSTRACT

An outer ring, an inner ring and a roller serving as a bearing component that adopts as a source material a steel ensuring a large fracture toughness value and also having an alloy element added thereto in a reduced amount and also provides sufficient wear resistance, are configured of a steel containing 0.15-0.3% by mass of carbon, 0.15-0.7% by mass of silicon, and 0.15-1.0% by mass of manganese, with a remainder of iron and an impurity, and have a raceway/rolling contact surface included in a region having a carbon enriched layer and a nitrogen enriched layer. In the nitrogen enriched layer the raceway/rolling contact surface has a nitrogen concentration equal to or larger than 0.3% by mass.

11 Claims, 9 Drawing Sheets

(56) References Cited

U.S. PATENT DOCUMENTS

| | | | |
|---|---|---|---|
| 5,800,637 A * | 9/1998 | Yamamura et al. | 428/698 |
| 5,908,515 A * | 6/1999 | Goto et al. | 384/912 |
| 6,358,333 B1 * | 3/2002 | Tanaka et al. | 148/327 |
| 6,478,894 B1 * | 11/2002 | Mitamura et al. | 508/105 |
| 6,517,644 B2 * | 2/2003 | Kiuchi et al. | 148/333 |
| 2004/0071379 A1 * | 4/2004 | Carrerot | 384/565 |
| 2005/0207687 A1 * | 9/2005 | Fujita et al. | 384/492 |
| 2007/0269336 A1 * | 11/2007 | Ohki et al. | 420/101 |

FOREIGN PATENT DOCUMENTS

| | | |
|---|---|---|
| JP | 08-311603 | 11/1996 |
| JP | 2000-246316 | 9/2000 |
| JP | 2004-052997 | 2/2004 |
| JP | 2005113257 A * | 4/2005 |
| JP | 2006-097096 | 4/2006 |
| JP | 2006-183845 A | 7/2006 |
| JP | 2007-239072 | 9/2007 |
| JP | 2007231974 A * | 9/2007 |
| JP | 2007302980 A * | 11/2007 |
| JP | 2007321895 A * | 12/2007 |
| JP | 2008-164105 A | 7/2008 |
| JP | 2008-267402 A | 11/2008 |
| JP | 2008-267525 A | 11/2008 |
| JP | 2009127114 A * | 6/2009 |
| JP | 2009222188 A * | 10/2009 |
| JP | 2009236232 A * | 10/2009 |
| JP | 2009-299759 A | 12/2009 |

* cited by examiner

BEARING COMPONENT, ROLLING BEARING, AND METHOD FOR PRODUCING BEARING COMPONENT

RELATED APPLICATIONS

This application is the U.S. National Phase under 35 U.S.C. §371 of International Application No. PCT/JP2010/054545, filed on Mar. 17, 2010, which in turn claims the benefit of Japanese Application No. 2009-073675, filed on Mar. 25, 2009, the disclosures of which Applications are incorporated by reference herein.

TECHNICAL FIELD

The present invention relates generally to bearing components, rolling bearings, and methods for producing bearing components, and particularly to bearing components, rolling bearings, and methods for producing bearing components, that can achieve improved wear resistance.

BACKGROUND ART

In recent years, as machines are increasingly reduced in weight and size, the rolling bearings used for the machines are also reduced in size. Accordingly, there is a tendency that contact pressure caused in the rolling bearing (or between a race member and a rolling element) increases. This results in increased temperature, and hence a lubricant degraded and reduced in viscosity. This in turn provides an insufficient oil film, which may result in the rolling element and the race member (an inner ring and an outer ring) having their respective surfaces in metal-to-metal contact with each other and thus increasingly worn. In particular, under such a condition of lubrication that an oil film parameter Λ represented by the following expression:

$$\Lambda = h_0/(\alpha_1^2 + \alpha_2^2)^{1/2} \quad (1)$$

has a value less than one, wear is a significant issue, wherein $h_0$ represents the oil film in thickness and $\alpha_1^2$ and $\alpha_2^2$ represent a raceway surface and the rolling element, respectively, in surface roughness RMS.

When the race member's raceway surface, the rolling element's surface (that contacts the race member) and the like are worn and thus have projections and depressions, the projections and depressions serve as a source of stress concentration or dropping iron powder is bit therein, and the rolling bearing may be reduced in lifetime.

One application in which a rolling bearing is disadvantageously worn, as described above, is for example a self-aligning roller bearing used for a guide roll of equipment operated to continuously cast steel. The guide roll of such equipment receives melted steel's weight and is exposed to heat of high temperature and thus thermally expands, warps, and/or the like. Accordingly, the guide roll is often supported by a rolling bearing (hereinafter referred to as a guide roll bearing) implemented as a self-aligning roller bearing that can tolerate an inner ring's aligning and also has a high ability to withstand axial load. The guide roll bearing is used under a condition with an inner ring rotating at an extremely low rate and a large load exerted, and thus has an oil film hardly formed and is worn at a raceway surface of an outer ring with a fixed load area. In particular, a self-aligning roller bearing has rollers in the form of barrels and it is thus known to cause differential slip, and a wear difference is caused between a simply rolling portion and a sliding portion and an outer ring raceway surface is partially worn forming two ridges. The partial wear results in two projections, at which stress concentration arises, and can be a cause of early exfoliation. Furthermore, melted steel is solidified by coolant water jetted thereto in a large amount, which causes water, vapor and the like to enter the bearing. A guide roll bearing used in such a severe condition of lubrication is required to prevent/minimize wear of its bearing components (such as a race member, a rolling element, and the like).

Furthermore, a steel configuring a bearing component of a bearing used in a high fit to a shaft is implemented by a carburized carburizing steel capable of providing a surface layer with compressive residual stress for the purpose of preventing tensile stress from reducing lifetime and cracking an inner ring. Carburized carburizing steel is excellent in fracture toughness at its core is smaller in hardness than its surficial carburized portion, and is thus more resistive to cracking than uniformly hardened steel (such as JIS SUJ2). Guide roll bearings are also formed universally with carburizing steel to avoid suddenly fracturing and prevent a roll from accordingly dropping off.

Furthermore, a carbonitriding process may be utilized as a means for enhancing wear resistance and increasing a bearing's lifetime while the bearing is provided with lubrication with foreign matters introduced therein. The carbonitriding process also effectively reduces/prevents a matrix's reduction in hardness at high temperature, and is used widely not only for a rolling bearing for equipment operated to continuously cast iron steel but also a rolling bearing for rolling equipment, a rolling bearing for a dryer roll of a paper making machine, and the like. However, these bearings are required to have further longer lifetime and simply performing a carbonitriding process does not ensure sufficient wear resistance.

Including conventional art as described above, two approaches have mainly been proposed to improve a bearing component in wear resistance. A first approach is to improve surface hardness. Surface hardness can be improved for example by the above carbonitriding process. While originally a bearing component of steel is quenched to be increased in hardness and is thus also excellent in wear resistance, a nitriding process can further increase its surface hardness and hence further improve its wear resistance (see Japanese Patent Laying-Open No. 8-311603 (patent literature 1) for example).

A second approach is to increase the amount of precipitates of large hardness. Fine precipitates of large hardness present in a large amount provide increased wear resistance. Production of precipitates of large hardness is significantly affected by an element added in steel. More specifically, adding vanadium (V), aluminum (Al), chromium (Cr), titanium (Ti), molybdenum (Mo) or the like to steel and for example carbonitriding it provides precipitates of large hardness (see Japanese Patent Laying-Open No. 8-49057 (patent literature 2) for example).

CITATION LIST

Patent Literature
  PTL 1: Japanese Patent Laying-Open No. 8-311603
  PTL 2: Japanese Patent Laying-Open No. 8-49057

SUMMARY OF INVENTION

Technical Problem

It is not easy, however, to provide sufficiently increased wear resistance by performing a carbonitriding process to simply improve surface hardness, including the approach of PTL 1. In particular, when steel having a carbon content equal to or smaller than 0.3% by mass is used as a source material for increased fracture toughness, it is difficult to provide sufficiently increased wear resistance by a carbonitriding process alone. On the other hand, adopting steel having Cr, Mo, V or a similar alloy element added thereto in a large amount and carbonitriding the steel can achieve large wear resistance. These alloy elements, however, are not supplied from sufficient sources. They may thus not be supplied constantly and accordingly their prices may soar, and accordingly, it is desirable that their addition to steel be maximally reduced.

Accordingly, the present invention contemplates a bearing component, a rolling bearing, and a method for producing a bearing component, that adopt as a source material a steel having a carbon content reduced to be equal to or smaller than 0.3% by mass to ensure a large fracture toughness value and also having an alloy element added thereto in a reduced amount and that also provide sufficient wear resistance.

Solution To Problem

The present invention in one aspect provides a bearing component configured of steel containing 0.15-0.3% by mass of carbon, 0.15-0.7% by mass of silicon, and 0.15-1.0% by mass of manganese, with a remainder of iron and an impurity. The bearing component has a surface included in a region having a carbon enriched layer having a higher carbon concentration than another region, and a nitrogen enriched layer having a higher nitrogen concentration than the other region and overlying the carbon enriched layer. In the nitrogen enriched layer the surface has a nitrogen concentration equal to or larger than 0.3% by mass.

Furthermore, the present invention in another aspect provides a bearing component configured of steel containing 0.15-0.3% by mass of carbon, 0.15-0.7% by mass of silicon and 0.15-1.0% by mass of manganese, and further tore containing at least one element selected from the group consisting of 0.4-2.0% by mass of chromium, 0.15-0.5% by mass of molybdenum, 1.0-2.0% by mass of nickel and 0.1-1.0% by mass of vanadium, with a remainder of iron and an impurity. The bearing component has a surface included in a region having a carbon enriched layer having a higher carbon concentration than another region, and a nitrogen enriched layer having a higher nitrogen concentration than the other region and overlying the carbon enriched layer. In the nitrogen enriched layer the surface has a nitrogen concentration equal to or larger than 0.3% by mass.

The present inventor has elaborately studied an approach that adopts as a source material a steel ensuring a large fracture toughness value and also having an alloy element added thereto in a reduced amount and also provides a bearing component with sufficient wear resistance. As a result, the present inventor has obtained the following findings and arrived at the present invention.

More specifically, wear resistance is improved in general by providing increased surface hardness and providing precipitates of large hardness, as has been described above. Herein, an amount of wear V is represented generally by the following expression (2):

$$V = K(WL/H) \quad (2),$$

wherein W represents a load, L represents a frictional distance, H represents hardness and K is a constant. That is, an amount of wear is inversely proportional to hardness.

It is difficult, however, to double, triple, or similarly further similarly multiply in hardness a bearing component formed of quench-hardened steel. It is thus difficult to double, triple or similarly further multiply a bearing component's wear resistance by increasing its hardness.

On the other hand, providing precipitates of large hardness requires adding V, Cr or a similar alloy element in a large amount. Preferably, however, adding such an alloy element should be minimized in view of its scarce source, as has been previously set forth above. Furthermore, the above alloy elements bind to nitrogen that has permeated into a matrix through a carbonitriding process or the like to produce nitride and thus precipitate as precipitates of large hardness. As such, when steel having the above alloy element(s) added thereto in a large amount is carbonitrided, it has a tendency that while it has a surface and a vicinity thereof with an increased nitrogen concentration, it has less deep permeation of nitrogen. Note that normally a carbonitriding process is performed at high temperature and accordingly a heat treatment causes deformation in an increased amount. To modify the deformation caused by the heat treatment, the bearing component having undergone the carbonitriding process needs to undergo a process with a relatively large machining allowance. As such, if the carbonitrided bearing component has less deep permeation of nitrogen and undergoes the process with the relatively large machining allowance, it may have a layer of a high nitrogen concentration (or a nitrogen enriched layer) removed in a large proportion or entirely.

The present inventor has noted as a new approach to provide enhanced wear resistance a method to cause a wear mode to transition from severe wear to mild wear at an early stage. Note that severe wear is a state in which a component or the like is worn fast as it slips fast and has a large contact pressure. In contrast, mild wear is a state in which a component or the like is worn slowly as it slips slowly and has a small contact pressure. When compared in specific wear rate, severe wear has a specific wear rate of approximately $10^{-7}$ to $10^{-8}$ mm$^2$/N, whereas mild wear has a specific wear rate equal to or smaller than $10^{-9}$ mm$^2$/N, and their wear rates are significantly different. (See Yuji YAMAMOTO et al., *Tribology*, Rikogakusha Publishing Co., Ltd.). Note that a specific wear rate is a worn volume divided by a product of a load and a frictional distance, and a specific wear rate having smaller values indicates larger wear resistance.

To provide increased wear resistance, it is important to cause severe wear to shift to mild wear (or severe-to-mild wear transition) early, and earlier transition contributes to smaller wear. In general, severe-to-mild wear transition is causable when an oxide film or a similar surface protection film is provided. To provide the surface protection film, it is effective to select a chemically highly adsorptive material or a chemically highly adsorptive environment. Quenched steel's martensite structure is a thermodynamically unstable structure at room temperature and accordingly, high in activity, and thus facilitates chemical adsorption of atmospheric gas. It is thus believed that a bearing component formed of quenched steel causes severe-to-mild wear transition (see *Wear*, Tadashi SASADA, Yokendo, for example). Furthermore, it is believed that further performing a nitriding process (or a carbonitriding process) causes the transition early. When a bearing component formed with steel having a carbon content equal to or smaller than 0.3% by mass used as a source material to ensure a large fracture toughness value is subjected to a carbonitriding process, it is nonetheless difficult for the bearing component to achieve the above transition sufficiently early for the following reason:

More specifically, generally, in a carbonitriding process, ammonia (NH$_3$) gas introduced in atmosphere functions as a source of nitrogen. More specifically, nitrogen is introduced into steel as a reaction proceeds as indicated by the following expression (3):

$$NH_3 \rightarrow \underline{N} + 3/2 H_2 \qquad (3),$$

wherein N represents nitrogen solved in steel. In other words, expression (3) indicates that when in-furnace atmosphere does not contain $NH_3$ gas, solid solution of nitrogen into steel does not proceed.

When a carburizing process and a nitriding process are simultaneously performed, i.e., when a carbonitriding process is performed, with an object to be processed, or a bearing component, configured of steel having a carbon content equal to or smaller than 0.3% by mass, the process is performed with the object heated to a high temperature exceeding 920° C. This is done in order to cause carbon to permeate into the bearing component fast, as the bearing component has a small carbon content and hence a high $A_1$ transformation point. When carbonitriding is done at such a high temperature, a majority of $NH_3$ gas contained in the atmosphere is decomposed into hydrogen ($H_2$) and nitrogen ($N_2$) and undecomposed $NH_3$ gas is present at a reduced ratio.

Note that a typical gaseous carbonitriding process is performed with $NH_3$ gas added at a ratio of approximately several percent (10% or lower) relative to endothermic converted gas contributing to carburization (see *Tekko Zairyo Binran* (the Handbook of Steel Materials), page 146, for example). When $NH_3$ gas is added at such a ratio, the gas has a majority thereof decomposed, and the bearing component will have a surface having a nitrogen concentration equal to or smaller than 0.1% by mass. Despite the surface having a nitrogen concentration of this extent, a bearing component used with lubrication provided thereto with hard foreign matters introduced can achieve long lifetime and a bearing component used at high temperature can achieve such increased temper softening resistance that the bearing component is required to have, and accordingly, a bearing component formed of steel having a carbon content equal to or smaller than 0.3% by mass is subjected to a carbonitriding process under a condition that a relatively low surface concentration of nitrogen is obtained.

The present inventor's study, however, has revealed that in view of establishing both improved fracture toughness and improved wear resistance, it is preferable that a bearing component formed of steel having a carbon content equal to or smaller than 0.3% by mass have a surface having higher nitrogen concentration. More specifically, it has been revealed that a surface having a nitrogen concentration equal to or larger than 0.3% by mass can implement early severe-to-mild wear transition and sufficiently enhance the bearing component in wear resistance.

The present bearing component described above adopts as a source material a steel having a carbon content equal to or smaller than 0.3% by mass to ensure a large fracture toughness value and also having an alloy element added thereto in a reduced amount to achieve an appropriate component composition. Furthermore, the bearing component has a surface included in a region having a carbon enriched layer to ensure sufficient hardness and also having a nitrogen concentration equal to or larger than 0.3% by mass to allow early severe-to-mild wear transition and hence achieve large wear resistance. As a result, the present bearing component can provide a bearing component that adopts as a source material a steel ensuring a large fracture toughness value and also having an alloy element added thereto in a reduced amount and that also has sufficient wear resistance. Note that the bearing component's wear resistance increases as the surface's nitrogen concentration increases. When the surface's nitrogen concentration exceeds 0.3% by mass, however, the improvement of the bearing component's wear resistance has a tendency to saturate. When the surface's nitrogen concentration exceeds 0.8% by mass, it may prevent diffusion of carbon also forming an interstitial solid solution, and accordingly, it is preferably equal to or smaller than 0.8% by mass. The steel's components are limited to the aforementioned range for the following grounds:

Carbon: ranging from 0.15% by mass to 0.3% by mass

Carbon less than 0.15% by mass may result in a core reduced in hardness, and hence insufficient strength. Furthermore, it necessitates a longer period of time for carburization. In contrast, carbon exceeding 0.3% by mass results in an insufficient fracture toughness value. Thus it is necessary that carbon ranges from 0.15% by mass to 0.3% by mass.

Silicon: ranging from 0.15% by mass to 0.7% by mass

Silicon less than 0.15% by mass may not ensure sufficient tempering and softening resistance. In contrast, silicon exceeding 0.7% by mass may result in poor carburization. Thus it is necessary that silicon ranges from 0.15% by mass to 0.7% by mass.

Manganese: ranging from 0.15% by mass to 1.0% by mass

Manganese less than 0.15% by mass may result in insufficient quenching. In contrast, manganese exceeding 1.0% by mass may result in manganese sulfide (MnS) or a similar non metallic inclusion being produced in a large amount. Thus it is necessary that manganese ranges from 0.15% by mass to 1.0% by mass.

Chromium: ranging from 0.4% by mass to 2.0% by mass

Chromium added in an amount equal to or larger than 0.4% by mass helps the bearing component to have a surface having high nitrogen concentration. To render this effect further significant, it is preferable that chromium is equal to or larger than 0.8% by mass. In contrast, chromium exceeding 2.0% by mass not only increases a source material's cost but also binds to nitrogen having permeated into the steel and thus forms nitride and may result in nitrogen permeating less deep. As such, the steel configuring the present bearing component may have 0.4-2.0% by mass of chromium added thereto.

Molybdenum: ranging from 0.15% by mass to 0.5% by mass

Molybdenum added in an amount equal to or larger than 0.15% by mass helps the bearing component to have a surface having high nitrogen concentration. In contrast, molybdenum exceeding 0.5% by mass increases a source material's cost. As such, the steel configuring the present bearing component may have 0.15-0.5% by mass of molybdenum added thereto.

Nickel: ranging from 1.0% by mass to 2.0% by mass

Nickel added in an amount equal to or larger than 1.0% by mass allows better quenching. In contrast, nickel exceeding 2.0% by mass increases a source material's cost. As such, the steel configuring the present bearing component may have 1.0-2.0% by mass of nickel added thereto.

Vanadium: ranging from 0.1% by mass to 1.0% by mass

Vanadium added in an amount equal to or larger than 0.1% by mass helps the bearing component to have a surface having high nitrogen concentration. In contrast, vanadium exceeding 1.0% by mass not only increases a source material's cost but also binds to nitrogen having permeated into the steel and thus forms nitride and may result in nitrogen permeating less deep. As such, the steel configuring the present bearing component may have 0.1-1.0% by mass of vanadium added thereto.

The present invention in another aspect provides a bearing component formed of the above steel that can be any one selected from the group consisting of JIS SCr420, SCM420 and SNCM420.

The above steel that is defined in JIS G4053 as an alloyed steel for mechanical structure use contains 0.23% by mass or smaller of carbon and not only has an alloy element added thereto in a small amount but also is a standard steel, and accordingly, its source materials are also readily available. Such steel used as a source material to produce a bearing component can provide the bearing component with an increased fracture toughness value and also provide as a source material a steel having an alloy element added thereto in a reduced amount. While the bearing component formed of any of the above three types of steel, and simply, normally carbonitrided has a surface having an insufficient nitrogen concentration, increasing the surface's nitrogen concentration to 0.3% by mass or more allows early severe-to-mild wear transition and hence large wear resistance. Thus the bearing component in another aspect of the present invention formed of steel that is SCr420, SCM420 or SNCM420 can be a bearing component formed with a source material of steel ensuring a larger fracture toughness value and also having an alloy element added thereto in a further reduced amount and also have sufficient wear resistance.

Preferably in the carbon enriched layer the surface has a carbon concentration of 0.6-1.2% by mass.

The surface having a carbon concentration equal to or larger than 0.6% by mass can be quenched to have sufficient surface hardness. In contrast, if the surface has a carbon concentration exceeding 1.2% by mass, it is excessively carburized and causes carbide to precipitate at a grain boundary and thus becomes brittle and may be reduced in strength. As such, the surface desirably has a carbon concentration ranging from 0.6% by mass to 1.2% by mass.

The present invention provides a rolling bearing including a race member and a plurality of rolling elements disposed on an annular raceway in contact with the race member. At least one of the race member and the rolling element is the bearing component of the present invention as described above.

By including the bearing component of the present invention as described above as at least one of the race member and the rolling element, the present rolling bearing can establish both a large fracture toughness value and sufficient wear resistance.

The present rolling bearing may be a self-aligning roller bearing. A self-aligning roller bearing has rolling elements in the form of barrels and thus has the race member and the rolling elements slipping differentially and the bearing component is disadvantageously worn. Accordingly, it is suitable to adopt as the self-aligning roller bearing the rolling bearing of the present invention as it has excellent wear resistance.

The present rolling bearing may be used as a bearing supporting a continuous casting roll rotatably relative to a member supporting the continuous casting roll for guiding a continuously cast object (i.e., a guide roll bearing).

A guide roll bearing has a race member rotated extremely slowly and also withstands a large load, and accordingly, has an oil film hardly formed and tends to be worn disadvantageously. It is thus suitable to adopt the present rolling bearing having excellent wear resistance.

The present invention in one aspect provides a method for producing a bearing component, including the steps of: preparing a shaped member configured of steel containing 0.15-0.3% by mass of carbon, 0.15-0.7% by mass of silicon and 0.15-1.0% by mass of manganese with a remainder of iron and an impurity; and heating the shaped member in an atmosphere containing carbon monoxide and ammonia to carbonitride the shaped member. The step of heating is performed to heat the shaped member to a temperature range of 920° C. to 960° C. with the atmosphere adjusted to contain undecomposed ammonia having a concentration equal to or larger than 0.2% by volume.

Furthermore, the present invention in another aspect provides a method for producing a bearing component, including the steps of: preparing a shaped member configured of steel containing 0.15-0.3% by mass of carbon, 0.15-0.7% by mass of silicon and 0.15-1.0% by mass of manganese, and furthermore containing at least one element selected from the group consisting of 0.4-2.0% by mass of chromium, 0.15-0.5% by mass of molybdenum, 1.0-2.0% by mass of nickel and 0.1-1.0% by mass of vanadium, with a remainder of iron and an impurity; and heating the shaped member in an atmosphere containing carbon monoxide and ammonia to carbonitride the shaped member. The step of heating is performed to heat the shaped member to a temperature range of 920° C. to 960° C. with the atmosphere adjusted to contain undecomposed ammonia having a concentration equal to or larger than 0.2% by volume.

The present method of producing a bearing component adopts as a source material a steel having a carbon content equal to or smaller than 0.3% by mass and having an alloy element added thereto in a reduced amount to provide an appropriate component composition. This ensures large toughness. Furthermore, a carbonitriding process is performed to provide a surface with sufficient hardness. Furthermore, the carbonitriding process is performed to provide heating to a temperature range of 920° C. to 960° C. with the atmosphere adjusted to contain undecomposed ammonia having a concentration equal to or larger than 0.2% by volume. Thus achieving high undecomposed ammonia concentration while heating to high temperature allows a shaped member (or the bearing component) to not only be permeated by carbon at a high rate but also have a surface having a high nitrogen concentration. The present method of producing a bearing component can thus facilitate producing the bearing component of the present invention as described above.

The method of producing a bearing component in another aspect of the present invention employs the steel that is any one type selected from the group consisting of JIS SCr420, SCM420 or SNCM420. A bearing component can be thus produced that adopts as a source material a steel ensuring a larger fracture toughness value and also having an alloy element to be added thereto in a further reduced amount and that also has sufficient wear resistance.

Advantageous Effects of Invention

As is apparent from the above description, the present bearing component, rolling bearing and method of producing the bearing component, that adopt as a source material a steel having a carbon content reduced to be equal to or smaller than 0.3% by mass to ensure a large fracture toughness value, and also having an alloy element added thereto in a reduced amount, and that also provide sufficient wear resistance.

DESCRIPTION OF EMBODIMENTS hereinafter reference will be made to the drawings to describe the present invention in embodiments. In the figures, identical or corresponding components are identically denoted and will not be described repeatedly in detail.

Figure 1:
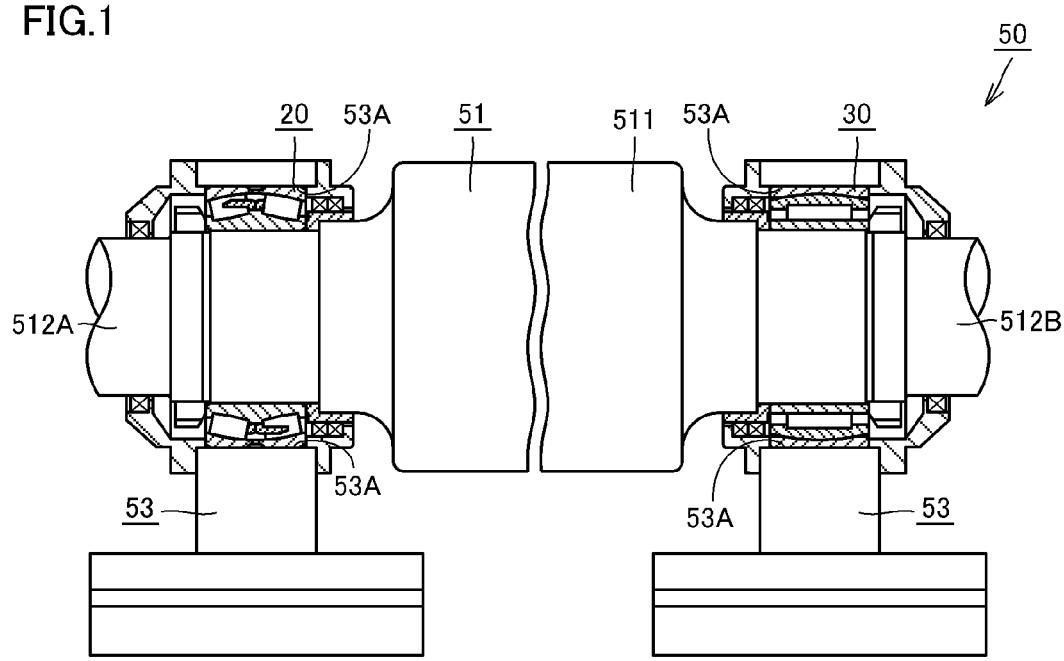
FIG. 1 is a schematic cross section in structure of a continuous casting guide roll device.

Hereinafter with reference to FIGS. 1-5 the present invention in one embodiment will be described. With reference to FIG. 1, a continuous casting guide roll device 50 includes a continuous casting roll 51 having at a center thereof a columnar roll unit 511 in contact with a continuously cast object for guiding the object. Furthermore, continuous casting roll 51 has one end having a columnar, fixed-end roll neck 512A smaller in diameter than roll unit 511. Furthermore, continuous casting roll 51 has the other end having a columnar, free-end roll neck 512B that serves as a roll neck associated with a side absorbing the axial extension of continuous casting roll 51 caused by thermal expansion and that is smaller in diameter than roll unit 511.

Furthermore, continuous casting roll 51 is held by a stand 53 having a roll holding unit 53A provided in the form of a cylindrical throughhole. Continuous casting roll 51 and stand 53 are disposed such that fixed-end roll neck 512A and free-end roll neck 512B penetrate roll holding unit 53A. Furthermore, a self-aligning roller bearing 20 is disposed between an outer circumferential surface of fixed-end roll neck 512A and an inner circumferential surface of roll holding unit 53A. Furthermore, a self-aligning ring equipped, cylindrical rolling bearing 30 is disposed between an outer circumferential surface of free-end roll neck 512B and an inner circumferential surface of roll holding unit 53A. Continuous casting roll 51 can thus be held rotatably relative to stand 53 around an axis to guide a continuously cast object. In other words, self-aligning roller bearing 20 and self-aligning ring equipped, cylindrical rolling bearing 30 are a guide roll bearing supporting continuous casting roll 51 rotatably relative to stand 53 supporting continuous casting roll 51 for guiding a continuously cast object.

Figure 2:
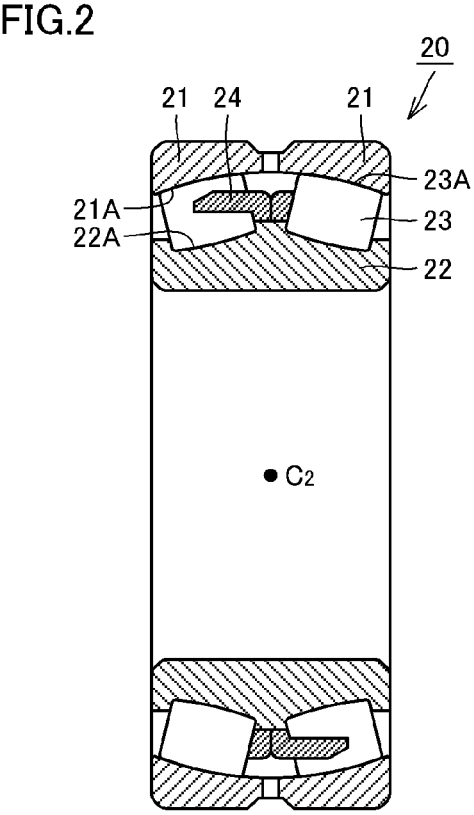
FIG. 2 is a schematic cross section of a self-aligning roller bearing in configuration.

Self-aligning roller bearing 20 and self-aligning ring equipped, cylindrical rolling bearing 30 will now be described. With reference to FIG. 2, self-aligning roller bearing 20 includes as bearing components two annular outer rings 21s serving as a race member, an annular inner ring 22 disposed inner than outer rings 21s and serving as a race member, and a plurality of rollers 23s (rolling elements) in the form of barrels disposed between outer ring 21 and inner ring 22 and held by an annular cage 24.

Outer ring 21 has an inner circumferential surface with an outer ring raceway surface 21A and inner ring 22 has an outer circumferential surface with an inner ring raceway surface 22A. Two outer rings 21s and one inner ring 22 are disposed such that inner ring raceway surface 22A faces two outer ring raceway surfaces 21As. Furthermore, the plurality of rollers 23s are disposed along outer ring raceway surfaces 21As, respectively, in contact with outer ring raceway surfaces 21As, respectively, and inner ring raceway surface 22A via a roller contact surface 23A (or outer circumferential surface), and also held by cage 24 and disposed circumferentially at a predetermined pitch to be held on two rows of annular raceways rollably. By the above configuration, self-aligning roller bearing 20 has outer ring 21 and inner ring 22 rollably relative to each other.

Furthermore, outer ring raceway surface 21A is a spherical surface having the bearing's center $C_2$ as its center. Outer ring 21 and inner ring 22 can thus form an angle with the bearing's center $C_2$ as a center in a cross section perpendicular to a direction in which roller 23 rolls. As a result, with reference to FIG. 1, when continuous casting roll 51 guiding a cast object accordingly flexes, stand 53 can stably, rollably hold continuous casting roll 51 via self-aligning roller bearing 20.

Figure 3:
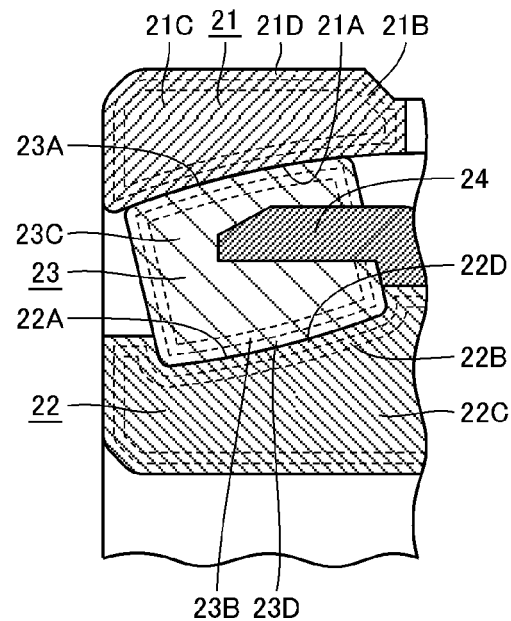
FIG. 3 is a schematic partial cross section with a main portion of FIG. 2 enlarged.

Furthermore, with reference to FIGS. 2 and 3, self-aligning roller bearing 20 is configured of bearing components, or outer ring 21, inner ring 22 and roller 23, that are configured of steel containing 0.15-0.3% by mass of carbon, 0.15-0.7% by mass of silicon, and 0.15-1.0% by mass of manganese with a remainder of iron and an impurity. With reference to FIG. 3, outer ring raceway surface 21A, inner ring raceway surface 22A and roller contact surface 23A are included in a region having carbon enriched layers 21B, 22B, 23B having a higher carbon concentration than another region, or core regions 21C, 22C, 23C, and nitrogen enriched layers 21D, 22D, 23D having a higher nitrogen concentration than core regions 21C, 22C, 23C and overlying carbon enriched layers 21B, 22B, 23B. In nitrogen enriched layers 21D, 22D, 23D, outer ring raceway surface 21A, inner ring raceway surface 22A and roller contact surface 23A have a nitrogen concentration equal to or larger than 0.3% by mass. Herein, the impurity is derived from a material of the steel, a substance introduced during the production process, or a similar, unavoidably introduced impurity.

Figure 4:
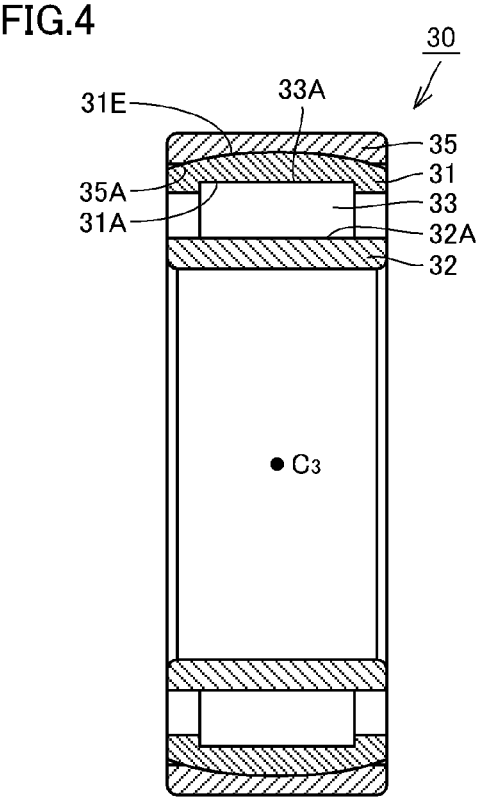
FIG. 4 is a schematic cross section of a self-aligning ring equipped, cylindrical rolling bearing in configuration.

On the other hand, with reference to FIG. 4, self-aligning ring equipped, cylindrical rolling bearing 30 includes as bearing components an annular outer ring 31, an annular inner ring 32 disposed inner than outer ring 31, a plurality of cylindrical rollers 33s disposed between outer ring 31 and inner ring 32, and an annular self-aligning ring 35 having an inner circumferential surface having a sliding surface 35A in contact with outer ring 31 at an outer circumferential surface 31E.

Outer ring 31 has an inner circumferential surface having an outer ring raceway surface 31A and inner ring 32 has an outer circumferential surface having an inner ring raceway surface 32A. Outer ring 31 and inner ring 32 are disposed such that inner ring raceway surface 32A and outer ring raceway surface 31A are opposite to each other. Furthermore, the plurality of rollers 33s are in contact with outer ring raceway surface 31A and inner ring raceway surface 32A via a roller contact surface 33A (or outer circumferential surface) and aligned circumferentially to be held on an annular raceway rollably. By the above configuration, self-aligning ring equipped, cylindrical rolling bearing 30 has outer ring 31 and inner ring 32 rollably relative to each other.

Furthermore, the outer ring 31 outer circumferential surface 31E and the self-aligning ring 35 sliding surface 35A are spherical surfaces, respectively, having the bearing's center $C_3$ as their respective centers and configured to be slidable relative to each other. Outer ring 31 and self-aligning ring 35 can thus form an angle with the bearing's center $C_3$ as a center in a cross section perpendicular to a direction in which roller 33 rolls. As a result, with reference to FIG. 1, when continuous casting roll 51 guiding a cast object accordingly flexes, stand 53 can stably, rollably hold continuous casting roll 51 via self-aligning ring equipped, cylindrical rolling bearing 30.

Figure 5:
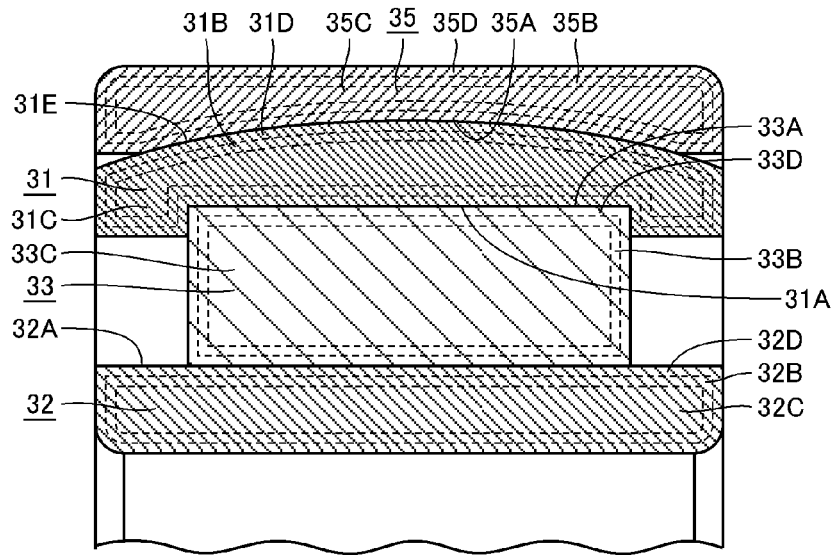
FIG. 5 is a schematic partial cross section with a main portion of FIG. 4 enlarged.

Furthermore, with reference to FIGS. 4 and 5, self-aligning ring equipped, cylindrical rolling bearing 30 is configured of bearing components, or outer ring 31, inner ring 32, roller 33, and self-aligning ring 35 that are configured of steel having a component composition similar to that of the self-aligning roller bearing 20 outer ring 21, inner ring 22 and roller 23. With reference to FIG. 5, outer ring 31, inner ring 32, cylindrical roller 33 and self-aligning ring 35 have surfaces, i.e., outer ring raceway surface 31A, inner ring raceway surface 32A, roller contact surface 33A and sliding surface 35A, respectively, included in a region having carbon enriched layers 31B, 32B, 33B, 35B having a higher carbon concentration than another region, or core regions 31C, 32C, 33C, 35C, and nitrogen enriched layers 31D, 32D, 33D, 35D having a higher nitrogen concentration than core regions 31C, 32C, 33C, 35C and overlying carbon enriched layers 31B, 32B, 33B, 35B. In nitrogen enriched layers 31D, 32D, 33D, 35D, outer ring raceway surface 31A, inner ring raceway surface 32A, roller contact surface 33A and sliding surface 35A have a nitrogen concentration equal to or larger than 0.3% by mass. Herein, the impurity is derived from a material of the steel, a substance introduced during the production process, or a similar, unavoidably introduced impurity.

The present embodiment provides a bearing component, or outer rings 21, 31, inner rings 22, 32, rollers 23, 33, and self-aligning ring 35, formed using as a source material the aforementioned steel having a carbon content equal to or smaller than 0.3% by mass to ensure a larger fracture toughness value and furthermore, having an alloy element added thereto in a reduced amount to provide an appropriate component composition. Furthermore, the bearing component has a surface, i.e., outer ring raceway surfaces 21A, 31A, inner ring raceway surfaces 22A, 32A, roller contact surfaces 23A, 33A and sliding surface 35A, included in a region having carbon enriched layers 21B, 22B, 23B, 31B, 32B, 33B, 35B to ensure sufficient hardness and nitrogen enriched layers 31D, 32D, 33D, 35D also have a surface having a nitrogen concentration equal to or larger than 0.3% by mass, and early severe-to-mild wear transition and hence large wear resistance are achieved. As a result, the present embodiment provides outer rings 21, 31, inner rings 22, 32, rollers 23, 33, and self-aligning ring 35 serving as a bearing component that adopts as a source material a steel ensuring a large fracture toughness value and also having an alloy element added thereto in a reduced amount and that also has sufficient wear resistance.

Furthermore, the present embodiment provides a rolling bearing, or self-aligning roller bearing 20 and self-aligning ring equipped, cylindrical rolling bearing 30, that can establish both a large fracture toughness value and sufficient wear resistance. Furthermore, the present embodiment provides continuous casting guide roll device 50 including self-aligning roller bearing 20 and self-aligning ring equipped, cylindrical rolling bearing 30 to serve as a rolling mill excellent in durability.

Note that outer rings 21, 31, inner rings 22, 32, rollers 23, 33, and self-aligning ring 35 may not be formed of the aforementioned steel and may instead be formed of a steel containing 0.15-0.3% by mass of carbon, 0.15-0.7% by mass of silicon and 0.15-1.0% by mass of manganese, and furthermore containing at least one element selected from the group consisting of 0.4-2.0% by mass of chromium, 0.15-0.5% by mass of molybdenum, 1.0-2.0% by mass of nickel and 0.1-1.0% by mass of vanadium, with a remainder of iron and an impurity. This helps outer rings 21, 31, inner rings 22, 32, rollers 23, 33, and self-aligning ring 35 to have a surface having high nitrogen concentration and can facilitate providing increased wear resistance.

In particular, replacing the aforementioned steel with SCr420, SCM420 or SNCM420 allows the replacement steel that ensures a larger fracture toughness value and also has an alloy element added thereto in a further reduced amount to be used as a source material to produce outer rings 21, 31, inner rings 22, 32, rollers 23, 33, and self-aligning ring 35 and can also provide sufficient wear resistance thereto.

Furthermore, carbon enriched layers 21B, 22B, 23B, 31B, 32B, 33B, 35B include a surface, or outer ring raceway surfaces 21A, 31A, inner ring raceway surfaces 22A, 32A, roller contact surfaces 23A, 33A and sliding surface 35A, having a carbon concentration preferably of 0.6-1.2% by mass. This allows a bearing to have required and sufficient surface hardness as a bearing.

Figure 6:
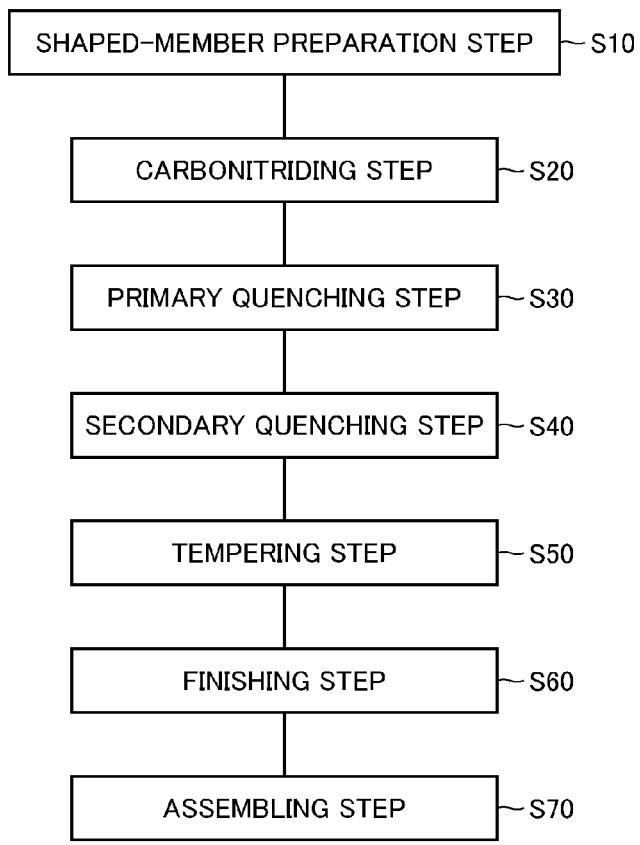
FIG. 6 is a flowchart schematically representing a method of producing a guide roll bearing.

Reference will now be made to FIG. 6 to describe a method for producing a bearing component and a rolling bearing in the present embodiment. The method for producing a bearing component and a rolling bearing in the present embodiment starts with a step (S10) or a shaped-member preparation step. In step (S10), a steel containing 0.15-0.3% by mass of carbon, 0.15-0.7% by mass of silicon and 0.15-1.0% by mass of manganese, and furthermore containing at least one element selected from the group consisting of 0.4-2.0% by mass of chromium, 0.15-0.5% by mass of molybdenum, 1.0-2.0% by mass of nickel and 0.1-1.0% by mass of vanadium, with a remainder of iron and an impurity, e.g., JIS SCr420, SCM420 or SNCM420, in the form of a bar, wire, and/or the like is prepared. The bar, wire and/or similar material of steel is/are cut, forged, turned and/or similarly processed and thus shaped into a bearing component or outer ring 21, inner ring 22, roller 23 and the like to prepare a shaped member.

Then, a heat treatment step including a step (S20) or a carbonitriding step, a step (S30) or a primary quenching step, a step (S40) or a secondary quenching step, and a step (S50) or a tempering step, is performed. The heat treatment step will more specifically be described later.

Then a step (S60) is performed to finish the shaped member having undergone the heat treatment step, i.e., a finishing step is performed. More specifically, for example, the shaped member having undergone the heat treatment step has outer ring raceway surface 21A, inner ring raceway surface 22A, roller contact surface 23A and the like polished. Thus the bearing component in the present embodiment completes and the method of producing a bearing component in the present embodiment completes.

Furthermore, a step (S70) is performed to assemble a rolling bearing, i.e., an assembling step is performed. More specifically, the bearing components in the present embodiment that are produced through the above steps, i.e., outer rings 21, 31, inner rings 22, 32, rollers 23, 33, self-aligning ring 35 and the like, are assembled together to provide self-aligning roller bearing 20 and self-aligning ring equipped, cylindrical rolling bearing 30. The rolling bearing in the present embodiment thus completes.

Figure 7:
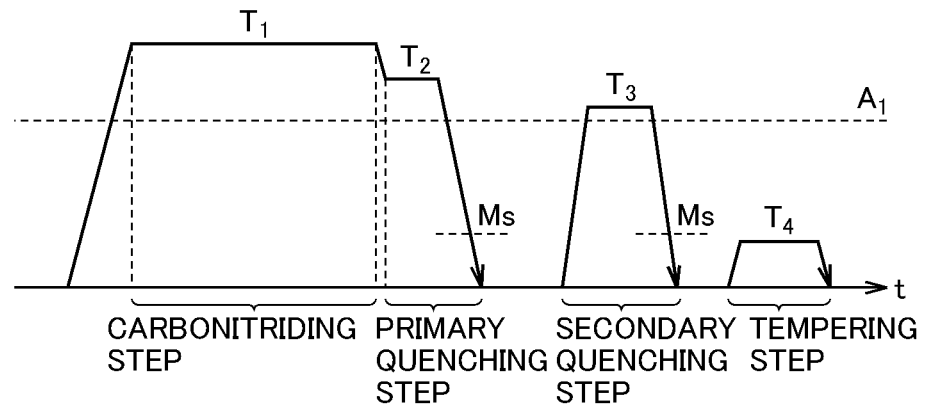
FIG. 7 is a diagram for specifically illustrating a heat treatment step included in the method of producing a guide roll bearing.

With reference to FIG. 7, the heat treatment step will now be described more specifically. In FIG. 7, the horizontal direction corresponds to time t, and it elapses as it proceeds rightwards. Furthermore, in FIG. 7, the vertical direction corresponds to temperature T, and it is higher upwards.

With reference to FIG. 7, the present embodiment provides the heat treatment step to initially carbonitride a workpiece, or a shaped member, i.e., perform a carbonitriding step (step (S20)). In step (S20), the shaped member prepared in step (S10) is heated in an atmosphere containing carbon monoxide and ammonia and thus carbonitrided. More specifically, the shaped member is introduced in an atmosphere that for example contains a base gas of an endothermic converted gas with an enriched gas added thereto to provide an adjusted, desired carbon potential value and that also has $NH_3$ gas added thereto, and the shaped member is heated therein to a temperature equal to or higher than an $A_1$ point, i.e., a carbonitriding temperature $T_1$ ranging from 920° C. to 960° C. The shaped member is thus carbonitrided and a carbon enriched layer and a nitrogen enriched layer are provided in a region including a surface of the shaped member. Note that the atmosphere is adjusted to contain undecomposed ammonia having a concentration (i.e., a concentration in the atmosphere of $NH_3$ gas present in the atmosphere without being decomposed) equal to or larger than 0.2% by volume.

Subsequently, the primary quenching step (step (S30)) is performed. In step (S30), the shaped member carbonitrided in step (S20) is cooled from a temperature equal to or higher than the $A_1$ point and lower than carbonitriding temperature $T_1$, i.e., a primary quenching temperature $T_2$, to a temperature range equal to or smaller than an $M_S$ point, and thus quench-hardened.

Furthermore, the secondary quenching step (S40) is performed. In step (S40), the shaped member quench-hardened in step (S30) is heated to a temperature equal to or higher than the $A_1$ point and lower than primary quenching temperature $T_2$, i.e., a secondary quenching temperature $T_3$, and subsequently cooled to a temperature equal to or lower than the $M_S$ point, and thus quench-hardened. This provides sufficient hardness to a surface of the shaped member provided with the carbon enriched layer in step (S20).

Subsequently, the tempering step (S50) is performed. In step (S50), the shaped member quench-hardened in step (S40) is heated to a temperature equal to or lower than the $A_1$ point and thus tempered. This alleviates distortion introduced into the shaped member as it has been quench-hardened. The above steps complete the heat treatment step in the present embodiment.

In the above heat treatment step at step (S20) the shaped member is carbonitrided as it is heated to a temperature range of 920° C. to 960° C. in an atmosphere adjusted to contain undecomposed ammonia to have a concentration having as large a value as equal to or larger than 0.2% by volume. The shaped member thus heated to high temperature therewhile carbonitrided in an atmosphere ensuring high undecomposed ammonia concentration can not only be permeated by carbon at a high rate but also have a surface having a high nitrogen concentration, more specifically a nitrogen concentration equal to or larger than 0.3% by mass.

Furthermore, in the heat treatment step, step (S20) is not performed to provide a carburizing process followed by a nitriding process at a temperature lower than that of the carburizing process to carbonitride the shaped member. Rather, it is performed to subject the shaped member to the carburizing process and the nitriding process concurrently. The carbonitriding process can thus be done in a reduced period of time. Furthermore, when the nitriding process is performed at a temperature lower than that of the carburizing process, the shaped member is permeated by nitrogen less deep. Note that the carbonitriding process is a heat treatment causing relatively large deformation of a workpiece. Accordingly, it is often the case that in the finishing step a grinding step or the like is performed to take relatively large machining allowance. As such, less deep permeation of nitrogen may result in a finished bearing component having a surface with insufficient nitrogen concentration. In contrast, performing a carburizing process and a nitriding process concurrently at a high temperature equal to or higher than 920° C. can produce a bearing component ensuring that nitrogen permeates sufficiently deep and help the bearing component to have a surface having a nitrogen concentration equal to or larger than 0.3% by mass.

Thus the present method for producing a bearing component can facilitate producing the bearing component of the present invention as described above.

The method including the heat treatment step above can produce the bearing component in the embodiment as described above. Note that the $A_1$ point is a point corresponding to a temperature at which the microstructure of steel when it is heated starts to transform from ferrite to austenite. Furthermore, the $M_S$ point refers to a point corresponding a temperature at which austenite steel starts to become martensite when the steel is cooled. Furthermore in the present invention a nitrogen concentration of a surface (outer ring raceway surfaces 21A, 31A, inner ring raceway surfaces 22A, 32A, roller contact surfaces 23A, 33A and sliding surface 35A) refers to an average value in concentration of nitrogen solved in a matrix at a region within 50 μm in depth from the surface.

EXAMPLE 1

Hereinafter an example 1 will be described. An experiment was performed to verify a relationship between surface concentration of nitrogen and wear resistance in order to quantitatively verify an effect of nitrogen solved in steel to reduce/prevent wear to know surface concentration of nitrogen required to cause early severe-to-mild wear transition. The experiment was conducted in the following procedure.

In the experiment, 5 types of steel indicated below in a table 1 were used as source materials. Note that table 1 indicates numerical values each representing an element's content in % by mass. Furthermore, the symbol "-" indicates that the corresponding element is not added and a remainder is formed of iron and an impurity.

TABLE 1

| | type of steel | C | Si | Mn | Ni | Cr | Mo | V |
|---|---|---|---|---|---|---|---|---|
| ex. A of present invention | SCM 420 | 0.2 | 0.3 | 0.8 | 0.1 | 1.2 | 0.15 | — |
| ex. B of present invention | SNCM 420 | 0.2 | 0.25 | 0.6 | 1.6 | 0.5 | 0.2 | — |
| comparative ex. A | SUJ 2 | 1.0 | 0.2 | 0.4 | 0.1 | 1.4 | — | — |
| comparative ex. B | SUJ 2 + C added steel | 1.2 | 1.0 | 0.3 | 0.8 | 1.5 | — | — |
| comparative ex. C | V added Carburizing steel | 0.35 | 0.3 | 0.3 | 0.8 | 1.8 | 0.3 | 0.4 |

Wear resistance was evaluated using a Savin type wear test machine. Initially, examples A and B of the present invention and comparative examples A-C had their respective steels shaped into rings having an inner diameter of (φ50 mm by an outer diameter of (φ64 mm by a height of 18 mm, and subjected to the carbonitriding step, primary quenching step, secondary quenching step and tempering step (steps (S20)-(S50)) as described in the above embodiment. In doing so, the carbonitriding process is performed with a carbon potential (CP) value set at a fixed value to allow examples A and B of the present invention and comparative example C to have their respective shaped bodies with their respective surfaces having equal carbon concentration distribution, respectively.

On the other hand, comparative examples A and B also provided as samples shaped bodies normally quench-hardened (immersion-quenched) and subsequently tempered. The carbonitriding step was performed in an atmosphere containing undecomposed ammonia varied in concentration to allow the shaped bodies to have a surface having a varying nitrogen concentration. The shaped bodies then had an end surface ground to complete test pieces. Furthermore, examples A and B of the present invention and comparative examples A-C had their respective shaped bodies that had been carbonitrided under the same condition(s) each cut along a plane perpendicular to a surface, and how nitrogen distributes in concentration in a vicinity of a surface of the plane was measured through electron probe micro analysis (EPMA). Nitrogen concentration at a surface of each test piece (i.e., an average nitrogen concentration in a matrix at a region within 50 μm from the surface) was obtained with the grinding step's machining allowance considered.

Figure 8:
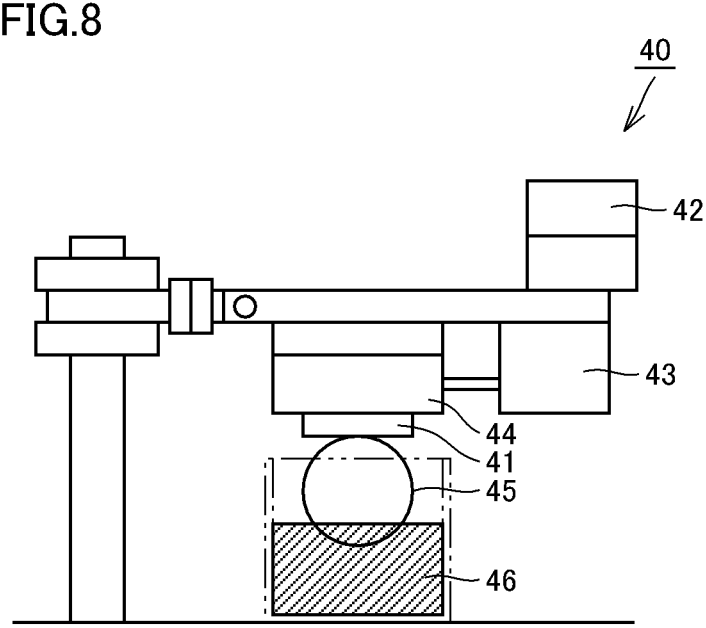
FIG. 8 schematically shows a configuration of a main portion of a Savin type wear test machine.
Figure 9:
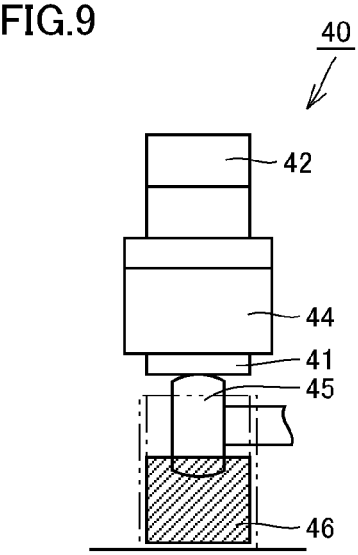
FIG. 9 schematically shows a configuration of a main portion of a Savin type wear test machine.

A wear test using the Savin type wear test machine will now be described. With reference to FIGS. 8 and 9, a Savin type wear test machine 40 includes a load cell 43 and an air slider 44. A wear test piece 41 in the form of a flat plate is held at air slider 44. A surface of wear test piece 41 and an outer circumferential surface of a counterpart 45 are brought into contact with each other and in that condition counterpart 45 is rotated. Wear test piece 41 and counterpart 45 contact each other without their respective contact surfaces directly supplied with a lubricant; rather, counterpart 45 partially contacts a felt pat 46 to supply the contact surfaces with a lubricant. The wear test was conducted under conditions as indicated in table 2.

TABLE 2

| counterpart | material: SUJ 2 immersion-quenched; 60HRC surface tested: rotation diameter: φ40 mm, curvature: R60 mm |
|---|---|
| load | 50 N (max. contact pressure Pmax = 0.49 GPa) |
| rate | 0.05 m/s (24 rpm) |
| time | 60 min (distance slid: approx. 180 m) |
| lubrication | oily lubrication: VG2 |

As indicated in table 2, rotating the counterpart at a reduced rate and using a lubricant having low viscosity allow evaluation of wear resistance under a condition of lubrication accompanied by metal-to-metal contact. Each test piece's wear resistance was evaluated by measuring a width along a shorter axis (parallel to a direction of rotation) of a wear track (in the form of an ellipse) caused on the test piece, and calculating a worn volume from the measurement.

Figure 10:
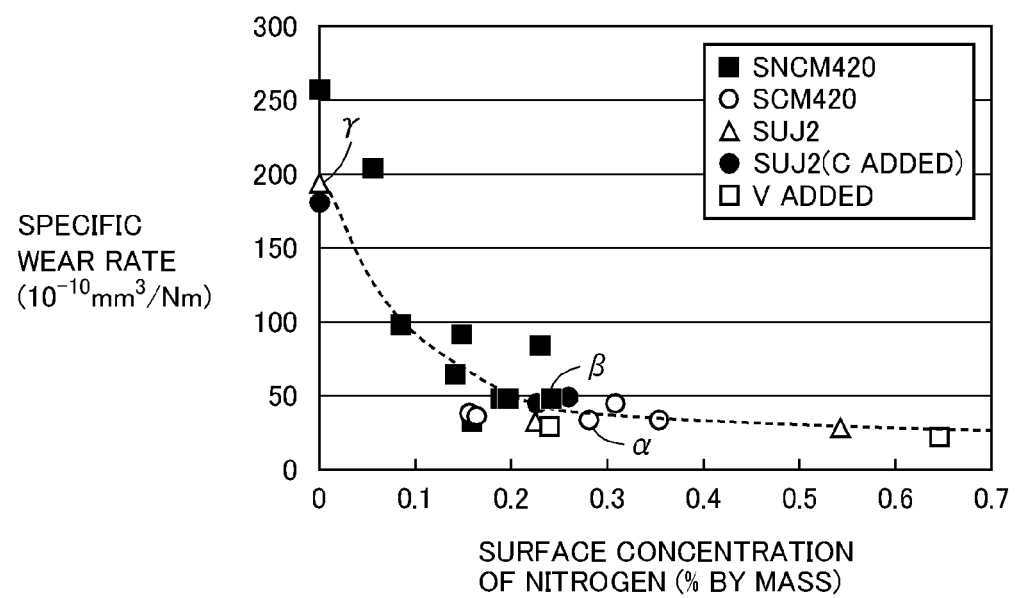
FIG. 10 represents a relationship between surface concentration of nitrogen and specific wear rate.

With reference to FIG. 10, the experiment provided a result, as will be described hereinafter. In FIG. 10, the axis of abscissas represents nitrogen concentration at a surface of each test piece and the axis of ordinates represents specific wear rate. As shown in FIG. 10, it has been revealed that wear resistance hardly depends on the composition of the steel configuring the test piece and is improved as surface concentration of nitrogen increases. That is, it is inferred that improvement of wear resistance is significantly affected by increased surface concentration of nitrogen.

Figure 11:
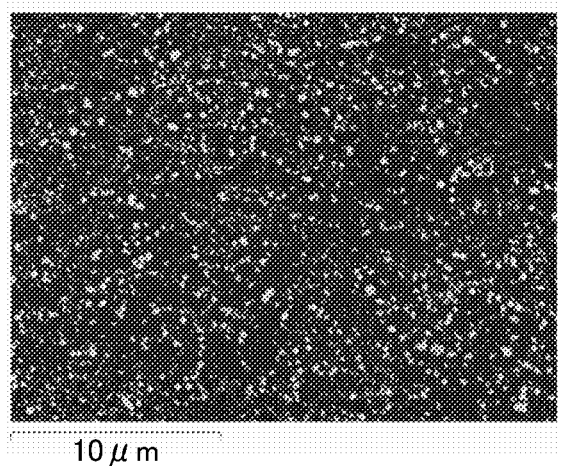
FIG. 11 is an SEM photograph showing a state of a precipitate in a vicinity of a surface in an example A of the present invention.
Figure 12:
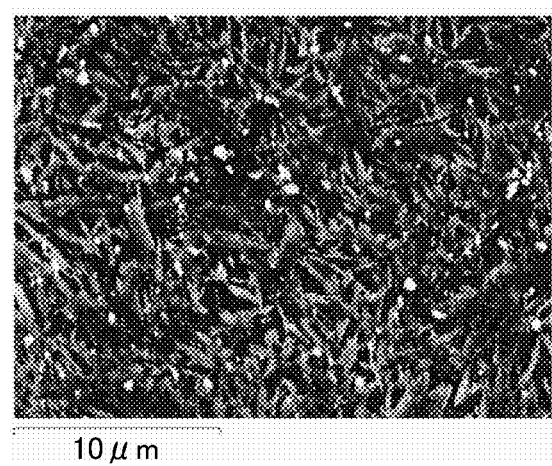
FIG. 12 is an SEM photograph showing a state of a precipitate in a vicinity of a surface in an example B of the present invention.
Figure 13:
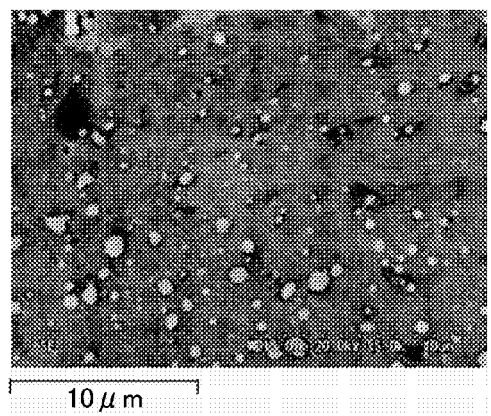
FIG. 13 is an SEM photograph showing a state of a precipitate in a vicinity of a surface in a comparative example A.

It is believed that, other than surface concentration of nitrogen, a factor that improves wear resistance is an effect of surface hardness, a precipitate of large hardness (carbide/nitride), and the like. Accordingly was examined a precipitate's condition and surface hardness at surfaces of test pieces corresponding to data points α, β, and γ in FIG. 10. Table 3 indicates the surface hardnesses and surface precipitate area ratios of the test pieces corresponding to α, β, and γ in FIG. 10. Furthermore, FIGS. 11, 12 and 13 show SEM images in a vicinity of surfaces of the test pieces corresponding to α, β, and γ in FIG. 10, respectively.

TABLE 3

| | surface hardness (HV) | precipitate area ratio (Area %) |
|---|---|---|
| α | 710 | 6.3 |
| β | 710 | 2.7 |
| γ | 740 | 6.7 |

With reference to table 3, non-nitrided SUJ2 material (γ) has larger surface hardness than carbonitrided SCM420 material (α) and SNCM420 material (β). Furthermore, with reference to table 3 and FIGS. 11-13, non-nitrided SUJ2 material (γ) also has a larger precipitate area ratio than carbonitrided SCM420 material (α) and SNCM420 material (β). As a result of the above wear resistance test, however, carbonitrided SCM420 material (α) and SNCM420 material (β) have specific wear rates equal to or smaller than ⅕ of that of non-nitrided SUJ2 material (γ). From the above result of the experiment, it has been revealed that increased surface concentration of nitrogen (an increased amount of nitrogen solved in a matrix at a region within 50 μm in depth from the surface) is a dominant factor to increase wear resistance.

EXAMPLE 2

An example 2 will now be described. An experiment was conducted to verify why increased surface concentration of nitrogen leads to increased wear resistance. More specifically, a material was carburized to prepare a test piece and an identical material was carbonitrided to prepare another test piece, and the test pieces underwent a wear test to examine how the amount of each test piece worn varies with time to confirm transition from severe wear to mild wear. The experiment was conducted in the following procedure.

Initially, JIS SUJ2 and SCM420 were prepared as steel materials serving as source materials, and shaped similarly as done in example 1 to obtain shaped bodies. The SUJ2 shaped body was normally immersion-quenched (or underwent standard quenching) to provide a test piece. The SUJ2 shaped body was also carbonitrided and quenched to provide another test piece. The SCM420 shaped body was carburized and quenched to provide a test piece. The SCM420 shaped body was also carbonitrided and quenched to provide another test piece. The test pieces were subjected to a wear test under the same conditions as example 1 to measure how the amount of each test piece worn varies with time.

Figure 14:
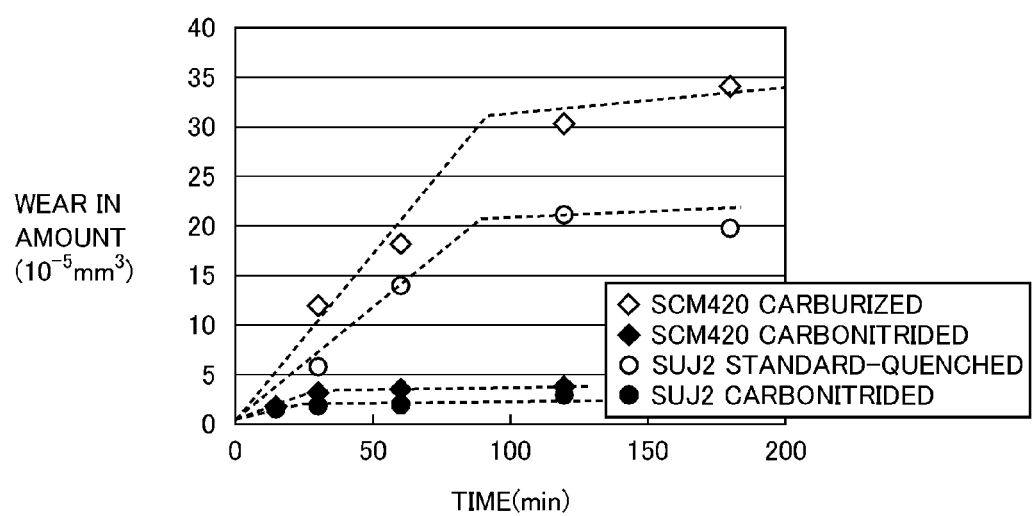
FIG. 14 shows how wear varies in amount with time.

With reference to FIG. 14, the experiment provided a result, as will be described hereinafter. In FIG. 14, the axis of abscissas represents time having elapsed since the test was started, and the axis of ordinates represents wear in amount.

With reference to FIG. 14, the test pieces formed of SCM420 and SUJ2 that had not been carbonitrided were continuously worn in a large amount (i.e., severely) per unit time after the test was started before nearly a period of time of 90 minutes elapsed, and thereafter the test pieces were worn in a small amount (i.e., mildly) per unit time. That is, severe-to-mild wear transition was achieved approximately 90 minutes after the test was started. In contrast, the test pieces formed of SCM420 and SUJ2 carbonitrided achieved severe-to-mild wear transition 15-30 minutes after the test was started. It can be seen that carbonitriding to allow a test piece to have a surface with increased nitrogen concentration allows early severe-to-mild wear transition.

Once transition to mild wear has been attained, wear progresses significantly slowly. It is thus believed that a test piece has a specific wear rate decreased as the test piece has a surface with increased nitrogen concentration, as has been described in example 1 with reference to FIG. 10, because of early transition to mild wear.

Furthermore, with reference to FIG. 10, a surface concentration of nitrogen equal to or larger than 0.1% by mass allows early severe-to-mild wear transition and can reduce a specific wear rate to approximately a half of that provided for a nitrogen concentration of 0% by mass. Furthermore, to ensure large wear resistance, a nitrogen concentration equal to or larger than 0.25% by mass is preferable, and to reduce/prevent specific wear rate variation and ensure constantly large wear resistance, it is necessary to provide a surface with a nitrogen concentration equal to or larger than 0.3% by mass. Furthermore, a surface having a nitrogen concentration exceeding 0.3% by mass to have a larger value does not provide significantly improved wear resistance, and for example SCM420 (example A of the present invention) obtains wear resistance equivalent to that of V added steel (comparative example C). In other words, it has been revealed that a surface having a nitrogen concentration equal to or larger than 0.3% by mass allows large wear resistance even with Cr, Mo, V or a similar alloy element added thereto in a reduced amount.

Note that a wear test conducted with a Savin type wear test machine provides a contact area increasing as wear progresses, and the test piece and the counterpart experience reduced contact pressure. However, a wear track smaller than the contact area is provided and a carbonitrided material which is worn in a small amount and does not experience reduced contact pressure is worn in a reduced amount per unit time, and it can thus be said that increased contact area is not a cause of reduction of wear in amount per unit time.

EXAMPLE 3

An example 3 will now be described.

An experiment was conducted to examine a heat treatment method for providing a nitrogen concentration equal to or larger than 0.3% by mass at surfaces of bearing components formed of SCr420, SCM420 and SNCM420 or a similar standard carburizing steel (an alloyed steel for mechanical structure use as defined by JIS G4053).

Initially, an investigation was conducted to obtain a relationship between a ratio of $NH_3$ introduced into a heat treatment furnace and undecomposed ammonia concentration in the atmosphere internal to the furnace (hereinafter also referred to as in-furnace $NH_3$ gas concentration) for atmospheric temperatures of 850° C. and 940° C. The experiment was conducted with a batch furnace having a volume of 120 L. Furthermore, the atmospheric temperature of 850° C. is a temperature assumed as a temperature applied to carbonitride high carbon chromium bearing steel having a carbon content of approximately 1% by mass (e.g., SUJ2) and the atmospheric temperature of 940° C. is a temperature assumed as a temperature applied to carbonitride alloyed steel for mechanical structure use having a carbon content of approximately 0.2% by mass (e.g., SCM420).

Figure 15:
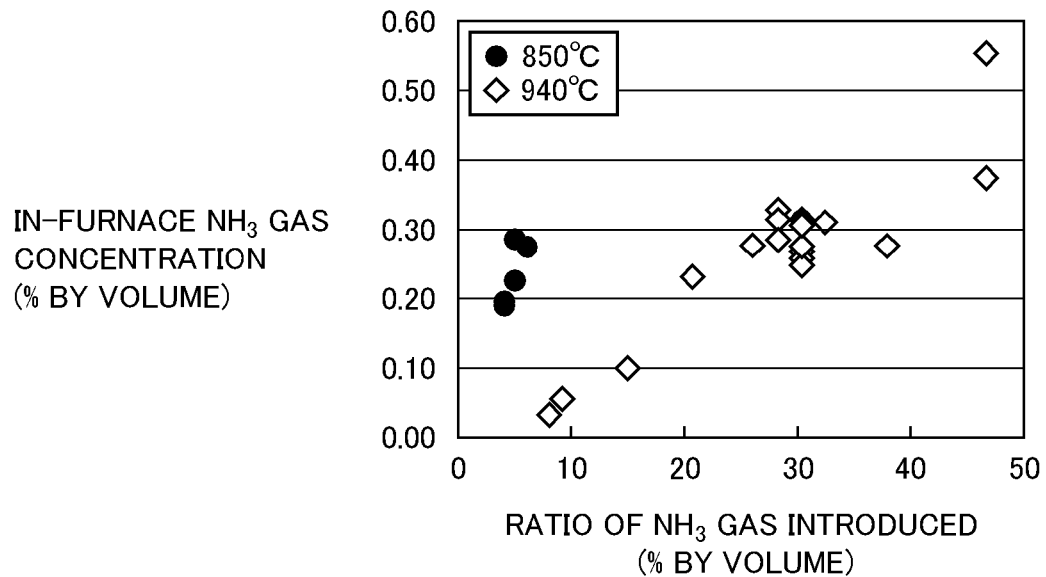
FIG. 15 shows a relationship between a ratio of $NH_3$ gas added and an $NH_3$ gas concentration in an atmosphere.

With reference to FIG. 15, the experiment provided a result, as will be described hereinafter. In FIG. 15, the axis of abscissas represents a ratio of $NH_3$ gas introduced into the furnace and the axis of ordinates represents undecomposed ammonia concentration in the furnace. Note that the ratio of $NH_3$ gas introduced/added indicates a ratio relative to a total amount added including an amount of converted gas added required for a carburizing process (i.e., the entire atmospheric gas).

With reference to FIG. 15, for a single ratio of $NH_3$ gas added, the atmospheric temperature of 940° C. results in an in-furnace $NH_3$ gas concentration (or undecomposed ammonia concentration) extremely lower than the atmospheric temperature of 850° C. does. This has revealed that increasing nitrogen concentration of a surface of a bearing component of the aforementioned standard carburizing steel by carbonitriding requires a ratio of $NH_3$ gas added that is significantly larger than when bearing steel or a similar high carbon material is adopted. Allowing the bearing component of the aforementioned standard carburizing steel to have a surface having a nitrogen concentration equal to or larger than 0.3% by mass requires carbonitriding with in-furnace undecomposed ammonia concentration equal to or larger than 0.2% by volume, preferably equal to or larger than 0.25% by volume.

EXAMPLE 4

An example 4 will now be described. An experiment was conducted to examine an effect that a content of a component composition of steel configuring a bearing component, Cr and V in particular, has on surface concentration of nitrogen.

More specifically, initially, test pieces formed of steels of example A of the present invention (SCM420), example B of the present invention (SNCM420), and comparative example C (V added steel), respectively, indicated in table 1 were prepared and carbonitrided under the same condition(s). The test pieces were carbonitrided similarly as done in the above embodiment. The test pieces were carbonitrided at 940° C. with a CP value of 1.3 and an in-furnace undecomposed ammonia concentration of 0.25% by volume. EPMA was employed to investigate carbon and nitrogen concentration distributions in a vicinity of a surface of each test piece.

Figure 16:
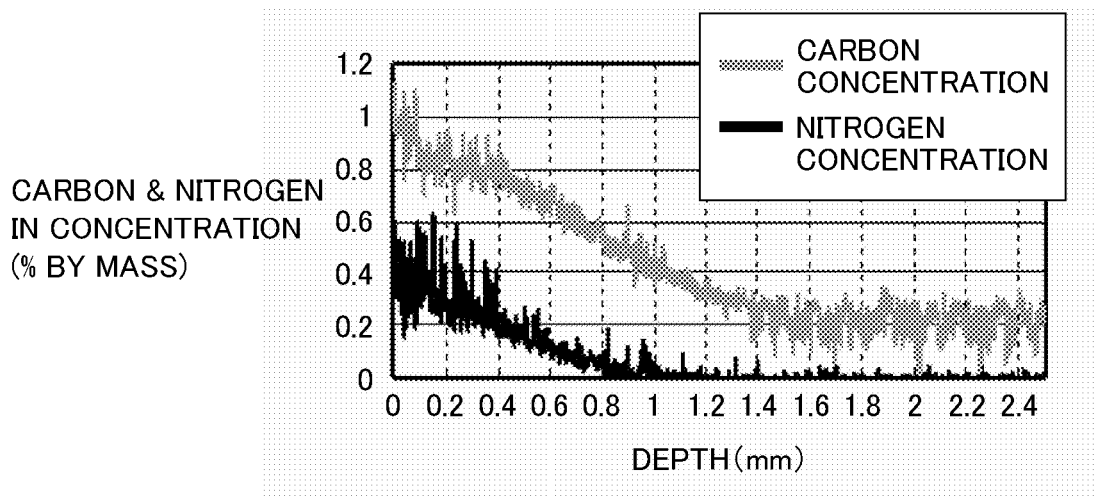
FIG. 16 represents carbon and nitrogen concentration distributions in a vicinity of a surface of SCM420.
Figure 17:
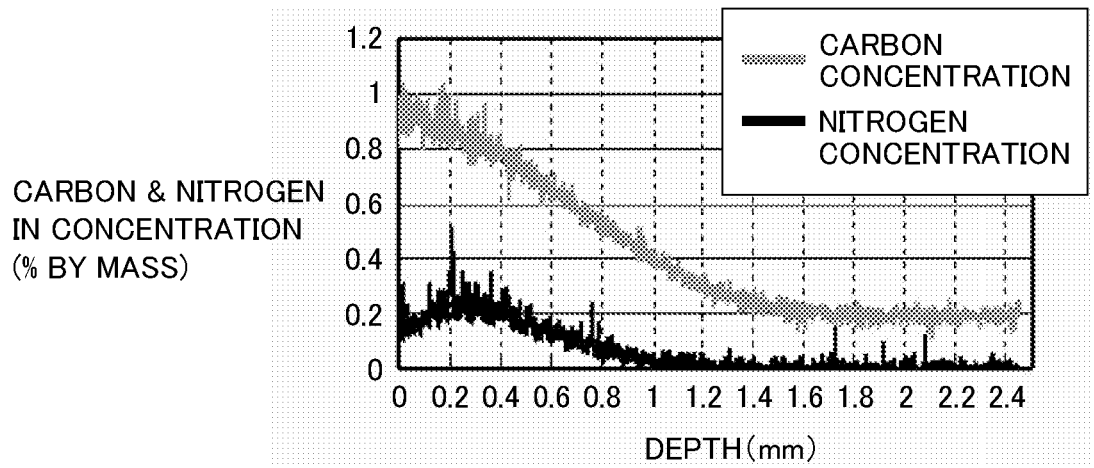
FIG. 17 represents carbon and nitrogen concentration distributions in a vicinity of a surface of SNCM420.
Figure 18:
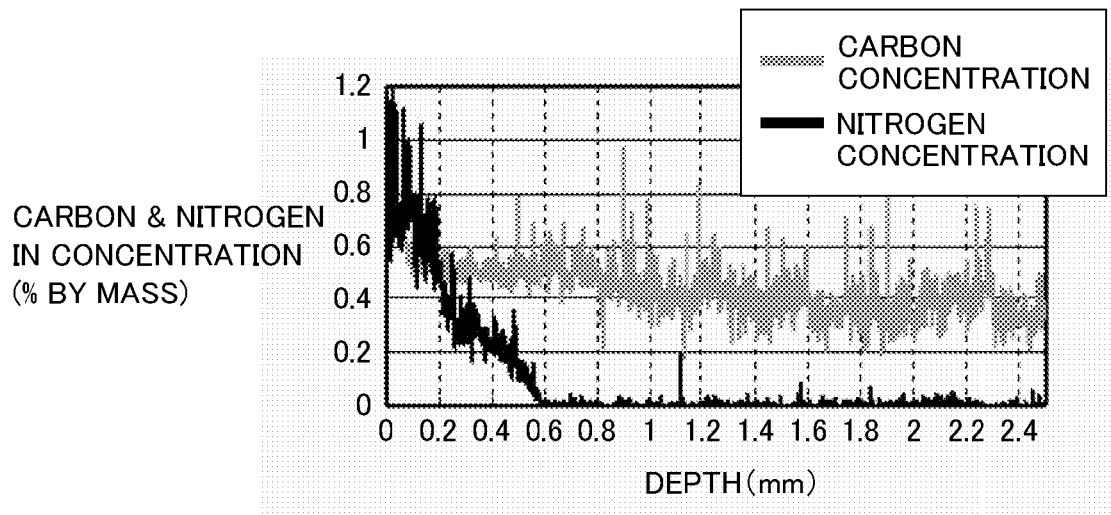
FIG. 18 represents carbon and nitrogen concentration distributions in a vicinity of a surface of V added steel.

The experiment provided a result, as will be described hereinafter. FIGS. 16, 17 and 18 represent carbon and nitrogen in concentration in SCM420, SNCM420 and V added steel, respectively, in a vicinity of a surface. In FIGS. 16-18, the axis of abscissas represents depth from surface and the axis of ordinates represents carbon and nitrogen in concentration.

With reference to FIGS. 16-18, SCM420 has a higher nitrogen concentration to a depth of 0.3 mm from a surface layer than SNCM420 does. This is believed to be an effect provided because SCM420 has a larger Cr content than SNCM420. Furthermore, V added carburizing steel further has a high nitrogen concentration at a surface layer portion. This is believed to be an effect of a large V content.

Thus, V and Cr have an effect helping to increase concentration of nitrogen solved in a matrix. Adding the components in increased amounts, however, entails an increased material cost. Furthermore, while the surface layer has an increased nitrogen concentration, nitrogen may permeate less deep. For example, a self-aligning roller bearing used as a guide roll bearing has at a raceway/rolling contact surface a machining allowance of approximately 0.3 mm after a heat treatment when it is ground. Accordingly in a carbonitriding process it is necessary that a nitrogen concentration at a depth of 0.3 mm from a surface be equal to or larger than 0.3% by mass. With these matters considered, Cr may be added in an amount of 1.0-1.5% by mass and V may be added in an amount of 0.1-1% by mass.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

Industrial Applicability

The present bearing component, rolling bearing and method for producing the bearing component is advantageously applicable to bearing components, rolling bearings and methods for producing the bearing components that are required to have increased wear resistance.

REFERENCE SIGNS LIST

20: self-aligning roller bearing; 21, 31: outer ring; 21A, 31A: outer ring raceway surface; 21B, 22B, 23B, 31B, 32B, 33B, 35B: carbon enriched layer; 21C, 22C, 23C: core region; 21D, 22D, 23D, 31D, 32D, 33D, 35D: nitrogen enriched layer; 22, 32: inner ring; 22A, 32A: inner ring raceway surface; 23, 33: roller; 23A, 33A: roller contact surface; 24: cage; 30: self-aligning ring equipped, cylindrical rolling bearing; 31E: outer circumferential surface; 35: self-aligning ring; 35A: sliding surface; 40: Savin type wear test machine; 41: wear test piece; 42: weight; 43: load cell; 44: air slider; 45: counterpart; 46: felt pat; 50: continuous casting guide roll device; 51: continuous casting roll; 511: roll portion; 512A: fixed-end roll neck; 512B: free-end roll neck; 53: stand; 53A: roll holding unit.

The invention claimed is:

1. A bearing component being made of steel that contains 0.15-0.3% by mass of carbon, 0.15-0.7% by mass of silicon, 0.15-1.0% by mass of manganese, with a remainder of iron and an impurity, and having a surface included in a region having a carbon enriched layer having a higher carbon concentration than a core region, and a nitrogen enriched layer having a higher nitrogen concentration than said core region and overlying said carbon enriched layer, an average value in concentration of nitrogen in a matrix at a region within 50 μm in depth from said surface is equal to or larger than 0.3% by mass.

2. The bearing component according to claim 1, wherein in said carbon enriched layer said surface has a carbon concentration of 0.6-1.2% by mass.

3. A rolling bearing comprising:
a race member; and
a plurality of rolling elements disposed on an annular raceway in contact with said race member, at least one of said race member and said rolling element being the bearing component according to claim 1.

4. The rolling bearing according to claim 3, being a self-aligning roller bearing.

5. The rolling bearing according to claim 3, supporting a continuous casting roll rotatably relative to a member supporting said continuous casting roll for guiding a continuously cast object.

6. A bearing component being made of steel that contains 0.15-0.3% by mass of carbon, 0.15-0.7% by mass of silicon and 0.15-1.0% by mass of manganese, and furthermore contains at least one element selected from the group consisting of 0.4-2.0% by mass of chromium, 0.15-0.5% by mass of molybdenum, 1.0-2.0% by mass of nickel, 0.1-1.0% by mass of vanadium, with a remainder of iron and an impurity, and having a surface included in a region having a carbon enriched layer having a higher carbon concentration than a core region, and a nitrogen enriched layer having a higher nitrogen concentration than said core region and overlying said carbon enriched layer, an average value in concentration of nitrogen in a matrix at a region within 50 μm in depth from said surface is equal to or larger than 0.3% by mass.

7. The bearing component according to claim 6, wherein said steel is any one selected from the group consisting of JIS SCr420, SCM420 and SNCM420.

8. The bearing component according to claim 6, wherein in said carbon enriched layer said surface has a carbon concentration of 0.6-1.2% by mass.

9. A rolling bearing comprising:
a race member; and
a plurality of rolling elements disposed on an annular raceway in contact with said race member, at least one of said race member and said rolling element being the bearing component according to claim 6.

10. The rolling bearing according to claim 9, being a self-aligning roller bearing.

11. The rolling bearing according to claim 9, supporting a continuous casting roll rotatably relative to a member supporting said continuous casting roll for guiding a continuously cast object.

* * * * *